United States Patent Office 3,453,841
Patented July 8, 1969

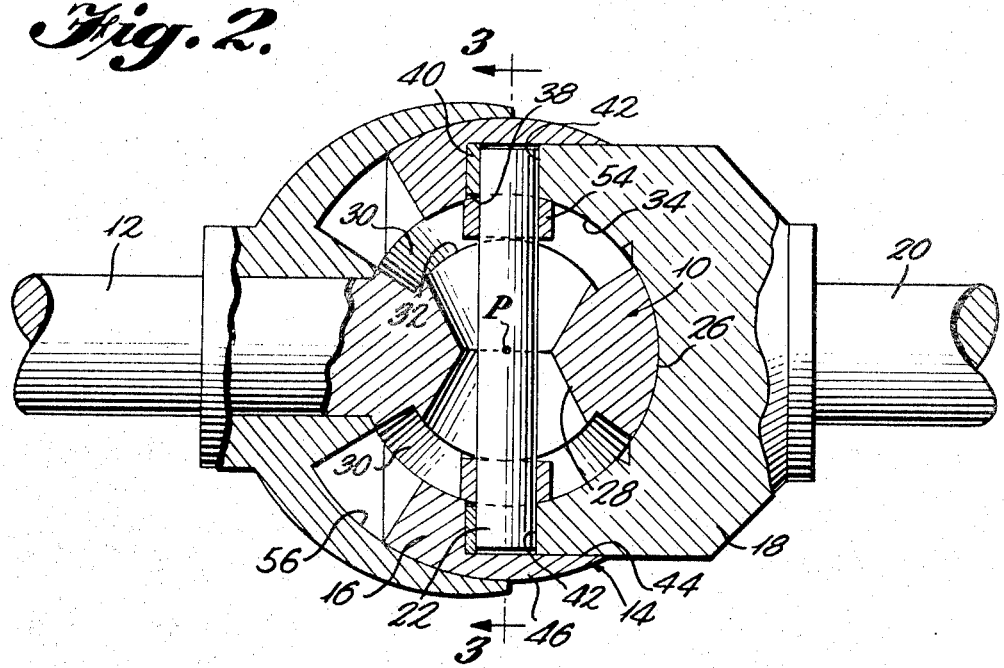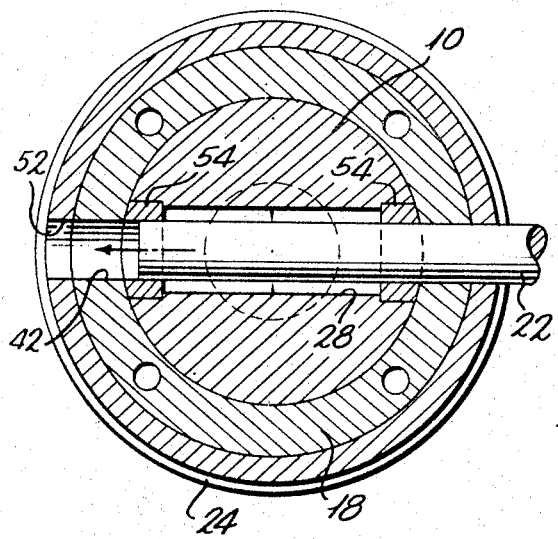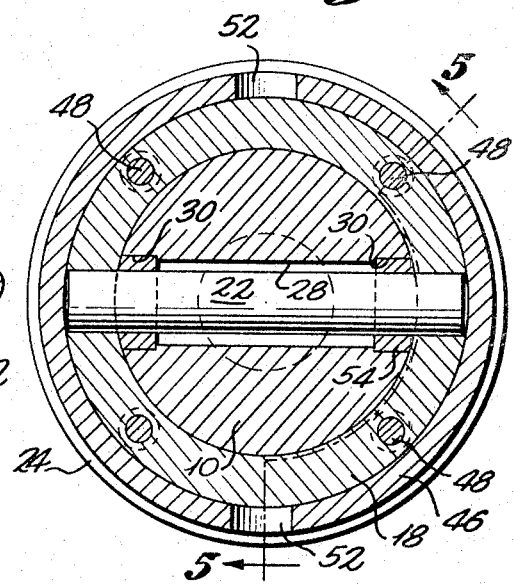

3,453,841
UNIVERSAL JOINTS
Calvin W. Federline, Rte. 1, Box 170,
Thurmont, Md.
Filed Mar. 9, 1967, Ser. No. 621,978
Int. Cl. F16d 3/02, 3/16, 3/50
U.S. Cl. 64—7
9 Claims

ABSTRACT OF THE DISCLOSURE

This disclosure contains a drawing and a description of a ball and socket type universal joint for transmitting torque between misaligned rotary shafts. Torque transmission between the ball and the socket of the joint is effected by a single transverse pin journaled relative to the socket member for rotation on its longitudinal axis and supported in bearing blocks slidably engaged in the ball to facilitate oscillatory movement about a transverse axis therethrough. This disclosure further illustrates and describes the manner in which the joint is assembled.

Background of the invention

This invention relates to universal joints for transmitting torque between a pair of misaligned rotary shafts, and more particularly, it concerns universal joints of the type including a ball and socket assembly together with a radial or transverse pin for transmitting torque between the respective ball and socket members of the assembly.

Ball and socket joints of the general type to which the present invention relates are quite commonly disclosed in prior publications and patents. Such universal joints are particularly desirable from the standpoint of providing a reasonably compact torque transmitting universal joint which is free from externally projecting parts that present a safety hazard typical to machinery incorporating rotary shafting. In other words, ball and socket type universal joints enable the achievement of a smooth exterior surface which is not likely to catch on a person's clothing, thereby avoiding a source of personal injury very prevalent in universal joints most commonly employed at the present time. Although ball and socket type universal joints are inherently desirable from a safety standpoint and for other reasons, they have not been used extensively principally because of manufacturing costs. In past designs of ball and socket type universal joints, both machining costs and assembly costs have made them noncompetitive with other universal joint designs which are less desirable from a safety standpoint.

Summary of the invention

In accordance with the present invention, an improved ball and socket type universal joint is provided in which a slotted ball member, adapted to be connected to one shaft, is received within a two-part socket member, one part of which is adapted to be connected to another shaft from or to which torque is transmitted. The shaft connected part of the socket member has a pair of aligned diametric bores for receiving a pin extending through the slotted ball and in a sliding engagement therewith by way of bearing blocks on the pin slidable in counter-slot bearing ways formed in the periphery of the ball member. The other part of the socket member has a skirt portion that telescopes over the shaft connected part and is adjustable rotatably with respect thereto so that a pair of diametric apertures in the skirt portion may be aligned with the diametric bores in the shaft connected part to facilitate insertion of the pin and then fixed in a non-aligned position to retain the pin in its operative position. The exterior of the second mentioned socket part is spherical in shape to enable an interiorly spherical dust guard to cover all moving parts.

Among the objects of the present invention are therefore; the provision of an improved ball and socket type universal joint devoid of any projecting elements that might catch on clothing or the like; the provision of a ball and socket type universal joint in which the parts may be formed with conventional shop techniques and then assembled in a manner to maintain manufacturing costs at a minimum; the provision of an improved ball and socket type universal joint in which the torque is transmitted directly between the parts thereof that are connected to a pair of rotary shafts; and the provision of a universal joint of the type aforementioned which greatly facilitates disassembly for repair and replacement of parts therein.

Other objects and further scope of applicability of the present invention will become apparent from the detailed description to follow, taken in conjunction with the accompanying drawings described below.

Brief description of the drawings

FIG. 2 is a cross-section taken on line 2—2 of FIG. 1;
FIG. 3 is a cross-section taken on line 3—3 of FIG. 2;
FIG. 4 is a cross-section similar to FIG. 3 but depicting the parts of the joint during assembly; and,
FIG. 5 is a cross-section taken on line 5—5 of FIG. 3.

Description of the preferred embodiment

Figure 1:
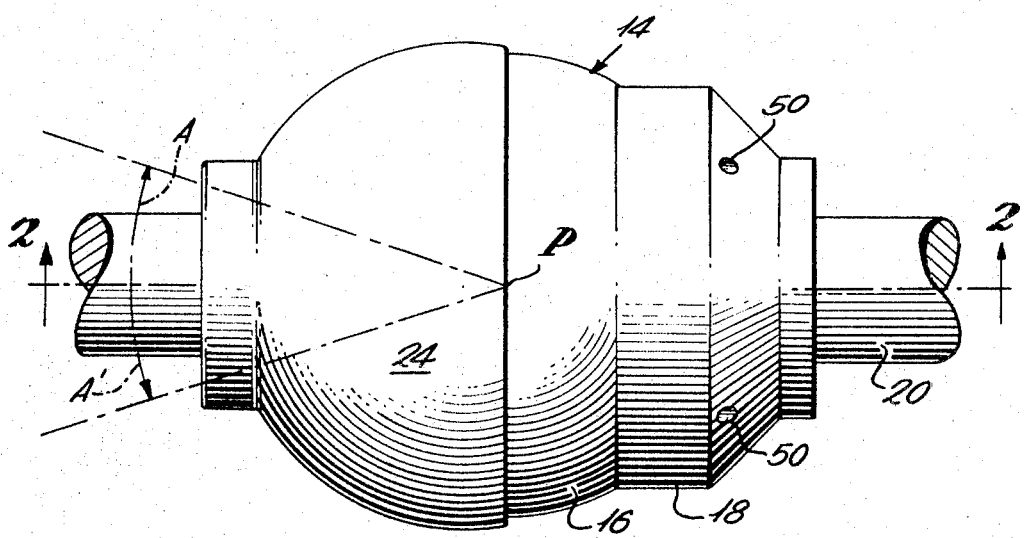
FIG. 1 is a plan view showing the exterior of the universal joint in accordance with this invention.

As shown in the drawings, the universal joint of this invention includes generally, a ball member 10 secured on the end of a rotatable shaft 12; a two-part socket member 14 having a spherical part 16 and a cylindrical part 18 fixed on a second shaft 20; a radial or transverse pin member 22 for transmitting torque between the ball member 10 and the socket member 14; and a guard member 24. In the embodiment shown, the universal joint is designed to transmit torque between the shafts 12 and 20 when the angle of intersection made by the axes of the respective shafts about a point P falls within the angles A or A¹ as shown in FIG. 1. The manner in which the respective parts mentioned above cooperate to achieve this result, as well as the manner in which they are assembled, is described in more detail below.

The ball 10 may be formed from an enlarged integral portion of the shaft 12 or more preferably, from a piece of metal welded or brazed thereon, and includes an outer convex spherical surface 26 concentric with the point of shaft intersection P. An outwardly diverging diametric slot 28 is formed in the ball member. The slot 28 opens into a pair of diametrically opposed counter-slots 30, which in turn, extend radially between the spherical surface 26 and an arcuate ledge or shoulder 32.

The ball 10 is slidably received in an undercut concave spherical surface formed in part by spherical surface portion 34 on the cylindrical socket member part 18 and in part by a spherical surface portion 36 in the spherical socket member part 16. The undercut concave spherical portion in the socket member 14 serves to secure the ball within the socket member 14 in the assembled joint.

The cylindrical part 18 is provided with an inner cylindrical surface 38 of a diameter equal to or greater than a great circle diameter of the spherical surface 34 to establish an annular part 40 having a pair of diametrically opposed circular bores 42 therein to receive the ends of the pin 22. The pin 22 is circular in cross-section and of a diameter to provide a close fit in the bores 42. Also, it will be noted that the pin is of a length slightly less than the external diameter of the cylindrical part 18 so that in the assembled joint, the pin lies within the outer circumference of the member 18 as shown in FIGS. 2 and 3 of the drawings.

Figure 5:
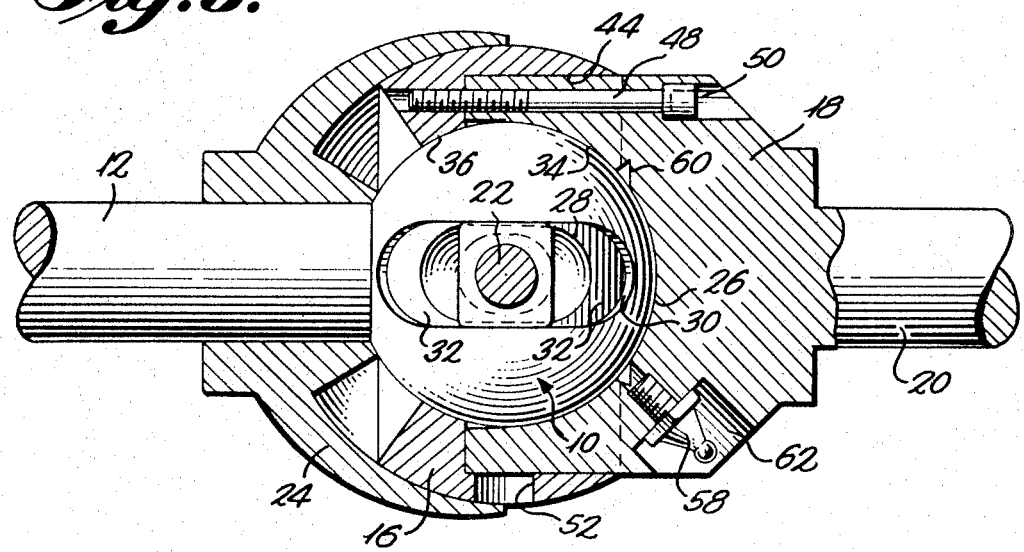

The spherical socket part 16 is provided with a large cylindrical counter-bore 44 to establish an annular skirt portion receivable in telescopic fashion over the cylindrical part 18. As shown in FIGS. 3 and 5 of the drawings, the parts 16 and 18 forming the socket member 14 are secured to one another by four Allen head screws 48 disposed on 90 degree centers, the heads of the screws 48 being received in counter sinks 50. Also it will be noted that the skirt 46 is provided with a pair of diametrically opposed bores 52 as shown in FIGS. 3 and 4 of the drawings for purposes of assembly to be described in more detail below.

It will be appreciated to those skilled in the art, that in order for torque to be transmitted between the ball 10 and the socket member 14 by the pin 22, the pin must accommodate pivotal movement about two mutually perpendicular axes. One of these axes is established by the axis of the pin itself and to this end, the ends of the pin may be rotatably journaled in the bores 42 of the cylindrical socket member part 18. The other of the axes referred to is an axis passing transversely through the pin and the point of shaft intersection P. To facilitate this pivotal movement about the latter axis, the pin passes through a pair of bearing blocks 54 in the form of centrally bored rectangular or square members having a depth substantially the same as that of the counter-slots 30. The outer surface of the bearing blocks may be spherically shaped to conform with the mating spherical surfaces on the ball 10 and the socket member 14. It will be noted further from FIGS. 3 and 4 of the drawings, that the width of the slot 28 in the ball is substantially greater than the diameter of the pin 26 so that no contact is made between the central portion of the pin and the walls of the slot 28. Instead, torque transmitting bearing contact is made only between sides of the bearing blocks 54 and the side walls of the counter-slots 30. Because the bearing blocks are maintained at the outer edge of the ball 10 by the shoulder 32 at the bottom of the counter-slots 30, the bearing loads eexrted by the blocks 54 against the sidewalls of the counter slot 30 are kept at a minimum for given torque loads.

The operation of the joint to transmit torque between the shafts 12 and 20 of the embodiment shown, where the shafts are misaligned, is conventional in the sense that rotation of one shaft to drive the other results in a corresponding movement of the socket member and the ball member relative to the pin, causing the pin to oscillate about a transverse axis through the point of intersection P causing the bearing blocks 54 to slide back and forth in the counter-slots 30. Simultaneously, the pin 26 rotates on its own axis relative to either the bearing blocks 54, or the bores 42 in the socket member part 18, or both.

The facilitate trouble-free operation of this type, the guard member 24 is provided with an interior spherical surface 56 to make sliding engagement with the outer surface of the spherical socket member part 16. This arrangement not only prevents foreign material such as dust and the like from fouling operation of the moving parts of the joint, but also it provides a measure of safety by contributing to a completely smooth external surface on the joint.

As shown in FIG. 5, the joint may be lubricated with grease or like lubricant introduced through a conventional grease nipple 58 in communication with a circular groove 60 formed in the spherical surface 34 on the interior of the cylindrical part 18. It will be noted that the grease nipple is located entirely within a counter bore 62 in a manner similar to the bolts 48 so that it does not project from the outer peripheral or circumferential surfaces of the joint.

Assembly of the joint disclosed is accomplished by first placing the socket member part 16 over the ball 10 and then placing the guard member 24 over these parts. The manner in which the guard member is secured in place may vary with the circumstances under which the universal joint is used. For example, in situations where only partial disassembly of the joint is required, the guard member may be welded or brazed in place on the shaft 12. In other situations, it may be desired to thread the guard member on the shaft 12 so that it may be readily removed and also to facilitate removal of the socket member part 16.

After the assembly of the socket member part 16 and guard member 24 over the ball member 10, the bearing blocks 54 are placed into the counter slots 30 and the cylindrical part 18 advanced into the large counter bore 44 in the spherical part 16. It is then rotated until the bores 52 in the skirt 46 align with the bores 42 in the annular portion 40 of the cylindrical part 18. The disposal of the holes in which the bolts 48 are received on 90 degree centers facilitates this orientation since alignment of the holes in the member 18 with the bolt holes in the member 16 at an angle of 90 degrees with respect to their ultimate position will retain the holes 52 aligned with the bores 42. Using a drift pin or other similar tool to align the bearing blocks 54 with the bores 42 and 52, the pin 22 may be advanced through the respectively aligned bores in these members. When the pin has been fully advanced, the member 18 is rotated 90 degrees with respect to the member 16, once more bringing the holes for the screw bolts 48 into alignment. The parts are then secured by placing and tightening the bolts 48. Because the holes 52 are 90 degrees out of alignment with the bores 42 as shown in FIG. 3 of the drawings, the pin 22 is retained in place by the skirt 46. To disassemble the joint, it will be appreciated that aforementioned procedure will be reversed.

Thus it will be appreciated that by this invention an improved ball and socket type universal joint is provided by which the above-mentioned objectives are completely fulfilled. Not only does the present invention possess the many advantages enumerated above, but also it provides an exceptionally smooth-running coupling for shafts disposed at greater angles and operating at higher speeds than incurred in conventional universal joint applications. Moreover, tests of the joint indicate an extremely small velocity variation between input and output shafts coupled by the joint. Hence, the universal joint of this invention operates at higher speeds and at wider shaft-angles while yielding less velocity variation than universal joints most widely used at present. Further, this joint transmits torque with less operational friction and with correspondingly greater efficiency than joints heretofore available.

Since variations in the embodiment disclosed herein will be apparent to those skilled in the art, it is expressly intended that the foregoing description is illustrative of a preferred embodiment only, not limiting, and that the true spirit and scope of this invention is to be determined by reference to the appended claims.

I claim:

1. A universal joint for transmitting torque between a pair of nonaligned shafts, said joint comprising: an inner ball member for connection to one of the shafts and having a transverse, slot-like aperture and counter-slots formed therein; an outer socket member fitted for universal pivotal movement on said ball member and adapted for connection to the other of said shafts, said socket member having a pair of diametrically aligned pin-receiving openings formed therein; a pin member extending through said slot-like aperture and counter-slots and into said openings, the end portions of said pin member being fitted in said openings, a pair of spaced bearing blocks on said pin within said ball member and maintained in place in said ball member by shoulders at the bottoms of said counter-slots and by spherical outer surfaces on said bearing blocks conforming to a mating spherical surface in said socket member, said bearing blocks also having planar faces which engage opposed parallel bearing surfaces in said counter-slots for sliding contact between said bearing block faces and planar parallel bearing surfaces during rotation of said joint.

2. The apparatus recited in claim 1 wherein said socket member comprises two parts, one part of which connects to the other of said shafts and includes said pin-receiving openings, the other part including a skirt portion telescopically received over said one part and said bores to retain said pin member against axial displacement.

3. The apparatus recited in claim 2 in which said two parts are rotatably adjustable with respect to one another and wherein said skirt portion is formed with a pair of openings therein registrable with said bores for assembly purposes and movable out of alignment therewith by rotational adjustment of said parts.

4. The apparatus recited in claim 2 wherein said other part has a spherical external surface portion and including a dust guard mounted for movement with said ball member and having an interior surface slidably engageable with the spherical surface on said other part.

5. A universal joint for transmitting torque between a pair of nonaligned shafts, said joint comprising: a ball member having a convex spherical outer surface concentric with the point of shaft axis intersection and adapted to be fixed to one of said shafts for rotation therewith, said ball member having a diametric slot formed therein and a pair of opposed radial counter slots extending from said spherical surface; a socket member having first and second parts to establish undercut concave spherical surface portions slidably engageable with the convex spherical surface on said ball member, said first socket member part being adapted for connection to the outer of said shafts and having a cylindrical outer surface and cylindrical inner surface portion of a diameter at least equal to the diameter of said concave spherical surface to establish an annular portion, said annular portion having a pair of aligned diametric bores formed therein, said second socket member part having a skirt portion positionable over the cylindrical outer surface of said first part, said skirt portion having a pair of further diametric bores located to be aligned or misaligned with bores in the annular portion of said first part by rotational adjustment of said first and second parts; a pin member of a length less than the inner diameter of said skirt portion, said pin member extending through said diametric slots and into said annular portion bores.

6. The apparatus recited in claim 5 including a plurality of threaded bolts extending axially between said socket member parts to secure said parts to each other with the respective diametric bores therein out of alignment, said bolts having heads disposed in counter sinks formed in said first socket member part.

7. The apparatus recited in claim 6 in which said bolts are positioned on 90° centers.

8. The apparatus recited in claim 5 including a grease nipple, said nipple being mounted entirely within a counter-bore formed in said first socket member part.

9. The apparatus recited in claim 5 in which a pair of bearing blocks are about said pin member and slidably positioned in said counter-slots.

References Cited
UNITED STATES PATENTS

| | | | |
|---|---|---|---|
| 771,457 | 10/1904 | Bullard | 64—7 |
| 1,222,268 | 4/1917 | Douglass | 64—7 |
| 1,225,524 | 5/1917 | Swartz | 64—7 |
| 1,836,987 | 12/1931 | Peake | 64—7 |
| 2,546,298 | 3/1951 | Browing | 64—7 |

HALL C. COE, *Primary Examiner.*